United States Patent [19]

Okuda et al.

[11] Patent Number: 4,960,562
[45] Date of Patent: Oct. 2, 1990

[54] DISPERSION STRENGTHENED FERRITIC STEEL CLADDING TUBE FOR NUCLEAR REACTOR AND ITS PRODUCTION METHOD

[75] Inventors: Takanari Okuda; Shigeo Nomura; Itaru Shibahara, all of Mito; Yoshinori Tateishi, Naka; Susumu Hirano, Amagasaki; Hiroshi Teranishi, Kobe; Masayuki Fujiwara, Kobe; Toshio Nishida, Kobe, all of Japan

[73] Assignees: Doryokuro Kakunenryo Kaihatsu Jigyodan; Sumitomo Metal Industries, Ltd.; Kobe Steel, Ltd., all of Osaka, Japan

[21] Appl. No.: 436,785

[22] Filed: Nov. 15, 1989

[30] Foreign Application Priority Data

Nov. 19, 1988 [JP] Japan .................................. 63-293202

[51] Int. Cl.$^5$ ................................................. G21C 3/00
[52] U.S. Cl. ..................................... 376/416; 420/34; 420/40; 29/723
[58] Field of Search .......................... 376/416; 420/40; 29/723

[56] References Cited

U.S. PATENT DOCUMENTS 4,075,010  2/1978  Fischer .................................. 75/235

Primary Examiner—Donald P. Walsh
Attorney, Agent, or Firm—Wenderoth, Lind & Ponack

[57] ABSTRACT

A dispersion strengthened ferritic steel cladding tube for use in a nuclear reactor and having a double-layer structure is provided. The cladding tube comprises a tube body made of a dispersion strengthened ferritic steel having a ceramic dispersed therein and containing 8 to 13% by weight of chromium. The inner surface of the tube body is lined with a ferritic steel containing 18 to 30% by weight of chromium. The cladding tube has not only excellent compatibility with a mixed oxide fuel but also excellent high temperature strength and swelling resistance.

A method of producing the cladding tube using powder metallurgy is also provided.

14 Claims, 1 Drawing Sheet

DISPERSION STRENGTHENED FERRITIC STEEL CLADDING TUBE FOR NUCLEAR REACTOR AND ITS PRODUCTION METHOD

BACKGROUND OF THE INVENTION

The present invention relates to a dispersion strengthened ferritic steel cladding tube for a nuclear reactor, which not only has excellent high temperature strength and swelling resistance but also is superior in compatibility with a mixed U/Pu oxide fuel (hereinafter simply referred to as the "fuel compatibility"). More particularly, the present invention concerns a dispersion strengthened ferritic steel cladding tube for use as a fuel cladding tube for a fast breeder reactor, improved, without substantial cost increase, in the fuel compatibility of the inner surface of the tube as required for prolonging the service life of fuel, and a method of producing such a cladding tube.

The fuel cladding tube for use in a fast breeder reactor serves to resist an internal pressure generated by gaseous fission products at a temperature as high as about 650° C. under fast neutron irradiation and to protect a mixed U/Pu oxide fuel contained therein. Excellent high temperature strength, resistance to swelling caused by fast neutron irradiation (swelling resistance) and fuel compatibility are especially important properties required for the cladding tube.

In order to improve the economical performance of a nuclear reactor plant, it is necessary to effectuate long duration combustion of a fuel. For this purpose, development of a high performance fuel cladding tube which can endure long term service is desired.

Heretofore, as a material for producing such a cladding tube, an austenitic stainless steel, such as SUS 316 type stainless steel, having excellent high temperature strength has been used. However, it has become apparent that the austenitic stainless steel has such poor swelling resistance that it cannot endure long duration service. On the other hand, a ferritic stainless steel has markedly improved swelling resistance as compared to that of the austenitic stainless steel. However, it has a demerit that its high temperature strength is low.

As a measure for improving the high temperature strength of the ferritic stainless steel, a method, such as a mechanical alloying method, is known in which fine particles of an oxide, such as $Y_2O_3$ or $ZrO_2$, having excellent heat resistance are dispersed in a metal by means of powder metallurgy so as to obtain a strengthened steel. It is believed that such an oxide dispersion strengthened ferritic steel will be a prime candidate material for a long life cladding tube.

While such a dispersion strengthened ferritic steel not only has excellent swelling resistance and high temperature strength but also is desirable as a material for a long life cladding tube, however, it has the following drawbacks.

As disclosed in an example of U.S. Pat. No. 4,075,010 entitled "Dispersion-Strengthened Ferritic Alloy for Use in Liquid-Metal Fast Breeder Reactors (LMFBRS)", most of dispersion strengthened ferritic steels have a Cr content of less than 16%.

This is because if the Cr content of a ferritic steel is high, as generally known in the art, the steel undergoes 475° C. brittleness and $\theta$ phase brittleness at a temperature of about 400° to 700° C. which is within the range of cladding tube operating temperatures, which causes a problem about the soundness of the tube. In order to suppress such brittlenesses, it is desired that the Cr content be about 15% or less.

Moreover, the dispersion strengthened ferritic steel has a problem of anisotropy, i.e., the high temperature strength of the steel is high along the rolling direction but low along the direction perpendicular thereto. In order to improve this peculiar anisotropy, introduction of a martensitic structure is preferred. And in order to form a martensitic structure, it is necessary that the Cr content should be limited to 13% or below. Therefore, the Cr content of the ferritic steel must be kept low.

On the other hand, the corrosion resistance, particularly oxidation resistance, of an Fe-Cr ferritic steel almost depends on the Cr content. Hence, when the Cr content is as low as 13% or below, a problem arises that the fuel compatibility due mainly to oxidation is inferior to that of austenitic stainless steels. Such a fuel compatibility, i.e., corrosion or the inner surface of a cladding tube works as a factor limiting the life and working capacity of a cladding tube made of a dispersion strengthened ferritic steel having excellent high temperature strength and swelling resistance. Accordingly, an improvement in the fuel compatibility is an important task.

SUMMARY OF THE INVENTION

An object of the present invention is to provide a dispersion strengthened ferritic steel cladding tube for a nuclear reactor which has not only excellent fuel compatibility but also excellent high temperature strength and swelling resistance.

Further object of the present invention is to provide a method of producing such a dispersion strengthened ferritic steel cladding tube as described above, without substantial cost increase.

As mentioned above, most of the conventional dispersion strengthened ferritic steels have the Cr content of less than 16%. While such ferritic steels have excellent high temperature strength and swelling resistance, they have a problem in the fuel compatibility due to a low level of the Cr content. In view of this situation, the present inventors have conducted extensive and intensive studies with respect to a method for improving the fuel compatibility.

As a result, it has been found that improvement of the fuel compatability can be attained by using a fuel cladding tube having a double-layer structure in which a fuel tube body is constructed utilizing the advantages (high temperature strength and swelling resistance) of a dispersion strengthened ferritic steel having a low level of Cr content and the inner surface thereof is lined with a ferritic steel having a high level of Cr content which exhibits excellent fuel compatibility. The present invention has accomplished by the above-described finding.

According to the present invention, it can be provided that a dispersion strengthened ferritic steel cladding tube with a double-layer structure for use in a nuclear reactor. The cladding tube comprises a tube body made of a dispersion strengthened ferritic steel having a ceramic dispersed therein and containing 8 to 13% by weight of chromium. The inner surface of the tube body is lined with a ferritic steel containing 18 to 30% by weight of chromium.

The present invention also provides a method of producing the above-described dispersion strengthened ferritic steel cladding tube. The method comprises providing a tubular capsule having an outer tube and an inner tube, the inner tube being made of a ferritic steel containing 18 to 30% by weight of chromium, packing a powder of a ferritic steel containing 8 to 13% by weight of chromium with a ceramic powder dispersed therein into a space formed between the outer and inner tubes of the tubular capsule, sealing the tubular capsule, subjecting the tubular capsule to hot working so as to integrate the powder with the inner tube, and removing the outer tube.

DETAILED DESCRIPTION OF THE INVENTION

The present invention will now be described in detail with reference to the drawings. "Percent" of chemical ingredients given in the specification is by weight.

Figure 1:
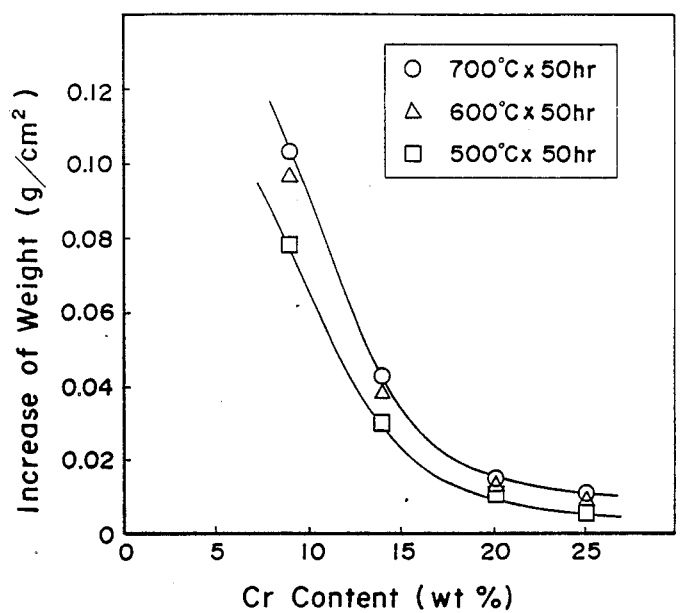
FIG. 1 is a graph showing the relationship between the corrosion characteristics of Fe-Cr steel under simulation fuel conditions and the Cr content.

Corrosion affecting the fuel compatibility is attributed to the oxidation by the moisture and the oxide fuel in the cladding tube, and the oxidation is accelerated by cesium and tellurium which are fission products. The present inventors have conducted a corrosion test simulating the fuel compatibility which is similar to a generally performed corrosion test using a high-temperature steam containing the fission products, i.e., tellurium and cesium for Fe-Cr steels having the Cr content varied from about 9 to about 25%. The test results are shown in FIG. 1. Simulation fuel conditions selected were such that test materials were exposed to a steam containing the fission products, i.e. cesium and tellurium, and having a temperature as high as 500° to 700° C. for a period of 50 hr and the weight change due to corrosion was measured. Test materials were those of Fe-Cr steels respectively having the Cr content of about 9, 14, 20 and 25%.

From FIG. 1, it is apparent that the extent of corrosion decreases with an increase in the Cr content, and that when the Cr content is about 18% or higher, the extent of corrosion is about a half or less of that exhibited when the Cr content is 14%. Accordingly, an improvement in the fuel compatibility is attained by increasing the Cr content of a dispersion strengthened ferritic steel cladding tube. However, the increase in the Cr content causes a problem of brittleness and selection of metallurgical structure as mentioned above.

Accordingly, one feature of the present invention resides in the attainment of fuel compatibility improvement, without adversely affecting the properties of the cladding tube, by lining the inner surface of the tube (dispersion strengthened ferritic steel) with a thin-wall tube made of a high-Cr ferritic steel, in addition to the tube body serving as a member for attaining mechanical strength.

LINING MATERIAL (INNER TUBE) FOR CLADDING TUBE BODY

The principal properties required of a lining material (inner tube) are as described in items (a) to (d) below.

(a) The Cr content must be high. Since the mechanical strength is supported by the cladding tube body, brittleness is not problematic.

(b) Swelling property must be equivalent to that of the cladding tube body. When the swelling is higher than that of the cladding tube body, an additional stress to the internal pressure will apply to the cladding tube body.

(c) Since it is worked simultaneously with the cladding tube body, its workability must be high.

(d) From the viewpoint of heat conductivity, the adhesion to the tube body must be high.

In view of the required properties as described in the above items (a), (b) and (c), the lining material be made of a ferritic steel containing 18 to 30% of chromium and substantially having a BCC structure. It is preferred that the lining material contains 0.2% or less of carbon and 18 to 30% of chromium, with the balance being iron and unavoidable impurities.

Chromium is a component which is important for attaining the fuel compatibility improvement. As shown in FIG. 1, the extent of corrosion rapidly decreases with an increase in the Cr content, until it reaches 18%. Above this value of the Cr content, the effect of its increase on the corrosion decrease tends to be gradual. When the Cr content exceeds 30%, the workability becomes poor. Therefore, the optimum Cr content is 18 to 30%.

Since the lining material is not a member for imparting mechanical strength, the addition of carbon is not necessary. However, when it is intended to improve the workability by precipitating a small amount of carbides in combination with the addition of titanium, niobium, etc. to render crystal particles finer, it is desirable to add a small amount of carbon. When the C content exceeds about 0.2%, however, excess hardening occurs, thereby adversely affecting the workability. It is preferred that the C content be 0.2% or lower.

Optionally, an element or at least two elements selected from among titanium, niobium, vanadium and zirconium may further be added in an amount not greater than 2% to improve the workability and fuel compatibility, in addition to the above-mentioned components.

CLADDING TUBE BODY

The cladding tube body is made of dispersion strengthened ferritic steel having a ceramic dispersed therein and containing 8 to 13% of chromium, and has high temperature strength and excellent swelling resistance. The base material of the cladding tube body includes a structure composed of ferrite and a martensitic structure incorporated therein. In this case, ductility increase and anisotropy decrease by heat treatment can be improved.

Chromium is an essential component for improving the corrosion resistance and decarburization resistance. In order to attain such resistance improvement, the Cr content must be at least 8%. However, when the Cr content exceeds 13%, the cladding tube body undergoes 475° C. brittleness and $\sigma$ phase brittleness due to an increase in the amount of $\delta$-ferrite at temperature which are within the range of cladding tube working temperatures (about 400° to 700° C.), thereby suffering from loss of mechanical strength and toughness. Moreover, even if it is intended to form a martensitic phase, it becomes impossible. Accordingly, the Cr content is limited to 8 to 13%.

The base material of the cladding tube body contains the above-mentioned chromium as an essential component. According to necessity, the base material may further contain an element or at least two elements selected from the following various elements in a appropriate amount. When such elements are to be added, a desirable amount of addition, action, etc. of each element will be described below.

Carbon is an element for austenite stabilization, and stabilizes a martensitic structure. Moreover, the element is combined with an alloying element, such as niobium, vanadium or chromium, so as to form fine carbide particles, thereby improving the creep rupture strength. When the C content is less than 0.04%, the effect is insufficient, and the cladding tube body suffers from marked loss of mechanical strength and toughness due to an increase in the amount of $\delta$-ferrite. On the other hand, when the C content exceeds 0.2%, the amount of the carbide is increased, thereby causing steel hardening and adversely affecting the workability and weldability. Therefore, the C content is limited to 0.04 to 0.2%.

Silicon is added as a deoxidizer and also controls the dispersion of oxides. When the Si content exceeds 0.3%, the enbrittlement during high temperature heating is significant. Accordingly, the Si content is limited to 0.3% or lower, preferably 0.1% or lower, to thereby ensure a high toughness improvement effect.

Manganese improves the hot processability and is effective for the structure stabilization. When the Mn content exceeds 1.5%, a hardened phase is formed, thereby adversely affecting the toughness and workability. Therefore, the Mn content is limited to 1.5% or lower.

Nickel is a component capable of stabilizing the martensitic structure as an austenite stabilizing element. It is contained in an amount of at least 0.1% in order to impart the mechanical strength, toughness and workability by regulating the amount of $\delta$-ferrite. However, when the Ni content exceeds 1%, the creep strength is adversely affected and the transformation temperature is so lowered that the heat treatment properties and workability and adversely affected. Therefore, the Ni content is limited to 0.1 to 1%.

Both of molybdenum and tungsten are solid solution strengthening elements and contributes to the creep strength improvement as the constituent element of a carbide or an intermetallic compound. When the content of each of them is less than 0.1%, no desired effect can be obtained. On the other hand, when the Mo content exceeds 2.5% or when the W content exceeds 4%, not only the amount of $\delta$-ferrite is increased to thereby adversely affect the toughness, but also a large amount of an intermetallic compound is precipitated at high temperatures to thereby cause enbrittlement. Therefore, the Mo content is limited to 0.1 to 2.5% and the W content is limited to 0.1 to 4%.

Vanadium is combined with carbon and nitrogen to form fine precipitates of V(C,N), which contributes to an improvement in the creep strength. Also it controls the dispersion of the oxide. When the V content is less than 0.1%, no sufficient effect can be obtained. On the other hand, when the V content exceeds 0.4%, the mechanical strength is adversely affected. Therefore, the V content is limited to 0.1 to 0.4%.

Like vanadium, niobium is combined with carbon and nitrogen to form fine precipitates of Nb(C,N), which contributes to an improvement in the creep strength. Also it controls the dispersion of the oxide. Moreover it is effective in rendering the structure finer, thereby improving the toughness. When the Nb content is less than 0.01%, no sufficient effect can be obtained. On the other hand, when the Nb content exceeds 0.2%, a large amount of precipitates which are not in the solid solution form are left during heat treatment, thereby adversely affecting the creep strength. Therefore the Nb content is limited to 0.01 to 0.2%.

Aluminum may be added as a deoxidizer. When the Al content exceeds 0.03%, however, the creep strength is adversely affected. Therefore, the Al content is limited to 0.03% or less.

Nitrogen is combined with vanadium and niobium to form a nitride, which contributes to an improvement in the creep strength. When the N content is less than 0.01%, no desired effect can be attained. When the N content exceeds 0.08%, the workability, toughness and weldability are lowered. Therefore the N content is limited to 0.01 to 0.08%.

Addition of small amount of boron contributes to the dispersion and stabilization of a carbide and hence to a creep strength improvement. When the B content is less than 0.001%, no desirable effect can be obtained. On the other hand, when the B content exceeds 0.01%, the workability and weldability are lowered. Therefore, the B content is limited to 0.001 to 0.01%.

When added individually or in combination in a small amount, zirconium, lanthanum, cerium and calcium are effective in removing phosphorus and sulfur contained in the impurities detrimental to toughness and controlling of inclusions. Also they control the dispersion of the oxide. When the total content of these elements is less than 0.05%, the above-mentioned effect cannot be attained. On the other hand, when the total content exceeds 0.3%, the toughness and workability are adversely affected. Therefore these elements are individually or in combination added in such an amount that the total content ranges from 0.05 to 0.3%.

Titanium reacts with dispersed particles of an oxide, such as $Y_2O_3$ powder, to form more stable dispersed particles, thereby contributing to the creep strength improvement. When the Ti content is less than 0.3%, no desired effect can be attained. On the other hand, when the Ti content exceeds 2%, the mechanical strength is adversely affected. Therefore the Ti content is limited to 0.3% to 2%.

Preferred examples of the composition having the above-described components include one comprising 0.04 to 0.2% of carbon, 0.3% or less of silicon, 1.5% or less of manganese, 8 to 13% of chromium, and 0.03% or less of aluminum with the balance being iron and unavoidable impurities. The composition may further comprises, besides a base composed of the above components, at least one element selected from the group consisting of nickel, nitrogen, boron and titanium and/or at least one element selected from the group consisting of zirconium, lanthanum, cerium and calcium. Moreover, the composition may further comprises, besides the above-described base, one or both of molybdenum and tungsten, or one or both of vanadium and niobium.

The ceramic to be homogeneously dispersed in the base material will now be described.

$Y_2O_3$, $ZrO_2$, $Al_2O_3$, and MgO powders are suitable as the ceramic, and one or more of them are added. When the mean particle diameter of the powder is larger than 3000 Å or less, the effect of improving the strength is small. Therefore, the mean particle diameter of the powder is preferably 3000 Å or less. When the total content of the above-described oxide powders is less than 0.05%, the above-described effect cannot be attained, while when it exceeds 1.5%, the toughness and workability are adversely affected. Therefore incorporation in an amount of 0.05 to 1.5% is preferred.

Homogeneous dispersion of the ceramic into the base material by powder metallurgy, such as mechanical alloying, can contribute to an improvement in the creep strength.

PRODUCTION OF CLADDING TUBE

The second feature of the present invention relates to the above-described characteristic requirement (d) and resides in a method of producing a cladding tube provided with a lining which is excellent in the adhesion without substantial cost increase.

In general, a tube, plate or rod is fromed through solidification and molding of metallic powder as follows. At the outset, a metallic powder is packed in a capsule, deaerated, sealed, and then solidified through hot working such as HIP or hot extrusion. The encapsulating material is removed by machining or pickling and the solidified product is then fabricated. For the production of a tube, a hollow capsule is used.

In the present invention, a fuel cladding tube is produced by the above-described powder metallurgy. In this case, a tubular capsule is used and an inner tube (lining material) is provided within the tubular capsule. A mixture of a metallic powder with a ceramic powder serving as a cladding tube body is packed in the space formed between the tubular capsule and the inner tube. A seamless pipe or a welded pipe is used as the above-described inner tube. Hot working is then conducted. The metallic powder used as the base material may be any of a metallic element powder and an alloy powder. After the working, fabrication is conducted without removing the inner tube to prepare a cladding tube provided with a lining.

Since the above-described method is one commonly employed for production of a dispersion strengthened ferritic steel cladding tube by powder metallurgy, there occurs no increase in the cost. Further, since the inner tube is jointed to the dispersion strengthened ferritic steel of the tube body under high temperature and high pressure conditions during solidification of the powder, the adhesion of the lining material is also excellent.

The thickness of the lining material is preferably about 10 to 100 μm in view of the effectiveness in improving the fuel compatibility and the limitation of the overall thickness of the cladding tube. The thickness of the lining material can be controlled by the wall thickness of the inner tube and the overall percentage fabrication up to the cladding tube.

Examples of the present invention will now be described.

[EXAMPLES]

Figure 2:
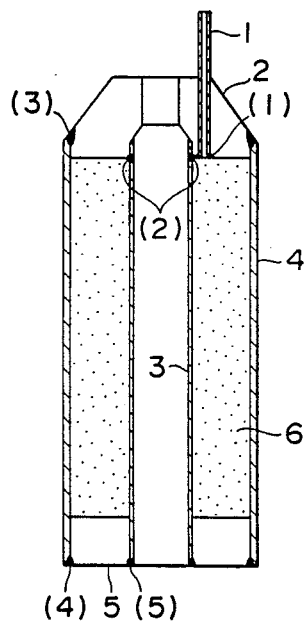
FIG. 2 is a cross-sectional view of a capsule for hot extrusion for production of a dispersion strengthened ferritic steel cladding tube.

In order to confirm the production of the dispersion strengthened ferritic steel cladding tube according to the present invention, a test was conducted by making use of a capsule shown in FIG. 2.

The capsule shown in FIG. 2 is a hollow capsule for hot extrusion and has a structure comprising an inner tube 3, an outer tube 4, a bottom 5, and a head 2 equipped with a degassing pipe 1. A lining material comprising 20% Cr ferritic steel shown in Table 1 is used as the inner tube 3. A powder 6 is prepared by mixing a base material (metallic powder) having a particle diameter of 500 μm or less with a finely divided oxide powder so as to have a composition shown in Table 2, further mixing the powder mixture in an argon atmosphere by means of an attritor and conducting a mechanical alloying treatment. The number of revolutions of the attritor is 200 to 250 rpm and the stirring time is 24 to 48 hr. The thus prepared powder 6 is packed in the space formed between the inner tube 3 and the outer tube 4. A mild steel was used for the degassing pipe 1, head 2, outer tube 4, and bottom 5.

In the compositions indicated in Table 2, the compositions of Nos. 1 and 2 are for the comparative example, and the composition of No. 3 is for the example of the present invention.

The capsule was assembled as follows.

The inner tube 3 was attached to the head 2 having the degassing pipe 1 (weld (1)) jointed thereto (weld (2)). Next, the outer tube 4 was attached to the head 2 (weld (3)). A powder mixture 6 was packed in the space formed between the inner tube 3 and the outer tube 4. The bottom 5 was then attached and welded to both of the outer tube 4 and the inner tube 3 (welds (4) and (5)). The capsule as assembled was evacuated to about $10^{-4}$ Torr for degassing through the degassing pipe 1 by a vacuum pump while heating to 400° C. Then the degassing pipe 1 was caulked and welded for sealing.

The sealed tubular capsule was heated at 1100° C. for 1 hr and subjected to hot extrusion (an extrusion ratio of 8 to 15:1) to prepare a tube material. The head and the bottom were cut, the curved portion was corrected, and the outer tube was removed by machining. The tube material was then subjected to warm rolling and warm drawing to prepare a dispersion strengthened ferritic steel cladding tube provided with a lining having a predetermined thickness.

The results of cold tensile test, tensile test at 650° C., and creep rupture test at 650° C. on the cladding tube body are shown in Table 3. The material under test is a cladding tube body subjected to normalizing at 950° to 1050° C. and tempering at 750° to 800° C. A test piece for tensile test was obtained in the form of a round rod tensile test specimen having a size of 6 mm$\phi \times$30 mmGL from the material under test in the direction of rolling (in the direction of L) and the direction perpendicular thereto (in the direction of T).

As is apparent from Table 3, the cladding tube body of the present invention exhibits creep rupture strength at 650° C.$\times 10^4$ hr exceeding 8.0 kgf/mm$^2$, i.e., a value much higher than that of the existing steel and is very small in the anisotropy of the ductility and creep rupture strength at 650° C.$\times 10^4$ hr.

Further the fuel compatibility was examined and the same results as those in the case of Cr content of 20% shown in FIG. 1 were obtained. Thus it was confirmed that the cladding tube body had excellent fuel compatibility. Separately, the cladding tube body was subjected to examination of the swelling resistance and found to have excellent swelling resistance.

TABLE 1

| Chemical composition of inner tube (lining material) (wt %) | | | | | | |
|---|---|---|---|---|---|---|
| C | Si | Mn | P | S | Cr | Ni |
| 0.014 | 0.12 | 0.32 | 0.002 | 0.001 | 20.1 | 0.1 |

TABLE 2

| No. | C | Si | Mn | Ni | Cr | Mo | W | V | Nb | Al | N | $Y_2O_3$ | Fe & impurities | Remarks |
|---|---|---|---|---|---|---|---|---|---|---|---|---|---|---|
| 1 | 0.07 | 0.21 | 0.55 | 0.05 | 8.92 | 2.02 | — | — | — | 0.005 | 0.017 | — | balance | Comparative Example |
| 2 | 0.22 | 0.27 | 0.53 | 0.37 | 11.82 | 1.04 | 0.52 | 0.32 | — | 0.011 | 0.033 | — | balance | Compatative Example |
| 3 | 0.10 | 0.18 | 0.48 | 0.33 | 11.06 | 0.49 | 1.92 | 0.21 | 0.07 | 0.008 | 0.051 | 0.24 | balance | Example of invention |

Chemical composition of cladding tube body (wt %)

TABLE 3

Test results of cladding tube body

Rolling direction (direction of L)

| Test No. | Tube body material No. | tensile strength (kgf/mm$^2$) at room temperature | elongation (%) at room temperature | tensile strength (kgf/mm$^2$) at 650° C. | elongation (%) at 650° C. | 650° C. × 10$^4$ hr creep rupture strength (kgf/mm$^2$) |
|---|---|---|---|---|---|---|
| 1 | 1 | 65.2 | 30.1 | 24.3 | 45.8 | 4.3 |
| 2 | 2 | 80.5 | 24.5 | 29.1 | 42.0 | 5.8 |
| 3 | 3 | 109.2 | 17.3 | 43.4 | 40.1 | 14.3 |

Direction perpendicular to rolling direction (direction of T)

| Test No. | tensile strength (kgf/mm$^2$) at room temperature | elongation (%) at room temperature | tensile strength (kgf/mm$^2$) at 650° C. | elongation (%) at 650° C. | 650° C. × 10$^4$ hr creep rupture strength (kgf/mm$^2$) | Remarks |
|---|---|---|---|---|---|---|
| 1 | 65.4 | 29.3 | 24.5 | 44.2 | 4.3 | Comp. Ex. |
| 2 | 80.3 | 23.5 | 29.0 | 42.1 | 5.6 | Comp. Ex. |
| 3 | 107.4 | 18.1 | 41.1 | 37.2 | 14.1 | Ex. of invention |

As is apparent from the foregoing, according to the present invention, a fuel cladding tube having a double-layer structure is formed by making use of particular materials, which enables production of a dispersion strengthened ferritic steel cladding tube having excellent high temperature strength and swelling resistance and an improvement in the anisotropy. Further, since usual powder metallurgy can be employed, the cladding tube can be produced without bringing about no significant increase in the cost. Therefore, the cladding tube of the present invention is suitable as a long life fuel cladding tube for a fast breeder reactor, which greatly contributes to an improvement in the economy of a nuclear reactor plant.

What is claimed is:

1. A dispersion strengthened ferritic steel cladding tube for use in a nuclear reactor and having a double-layer structure, said cladding tube comprising a tube body made of a dispersion strengthened ferritic steel having a ceramic dispersed therein and containing 8 to 13% by weight of chromium, an inner surface of said tube body being lined with a ferritic steel containing 18 to 30% by weight of chromium.

2. The dispersion strengthened ferritic steel cladding tube according to claim 1, wherein said tube body has a composition of its base material comprising 0.04 to 0.2% by weight of carbon, 0.3% by weight or less of silicon, 1.5% weight or less of manganese, 8 to 13% by weight of chromium, and 0.03% by weight or less of aluminum, with the balance being iron and unavoidable impurities, the ceramic being dispersed in said base material.

3. The dispersion strengthened ferritic steel cladding tube according to claim 2, wherein said ceramic comprises one or more selected from the group consisting of $Y_2O_3$, $ZrO_2$, $Al_2O_3$ and MgO.

4. The dispersion strengthened ferritic steel cladding tube according to claim 2, wherein said ceramic is incorporated in an amount of 0.05 to 1.5% by weight.

5. The dispersion strengthened ferritic steel cladding tube according to claim 2, wherein said ceramic has a mean particle diameter of 3000 Å or less.

6. The dispersion strengthened ferritic steel cladding tube according to claim 1, wherein said ferritic steel of the lining material has a composition comprising 18 to 30% by weight of chromium and 0.2% by weight or less of carbon, with the balance being iron and unavoidable impurities.

7. The dispersion strengthened ferritic steel cladding tube according to claim 1, wherein said lining material has a thickness of 10 to 100 μm.

8. A method of producing a dispersion strengthened ferritic steel cladding tube for use in a nuclear reactor and having a double-layer structure, said method comprising
providing a tubular capsule having an outer tube and an inner tube, said inner tube being made of a ferritic steel containing 18 to 30% by weight of chromium;
packing a powder of a ferritic steel containing 8 to 13% by weight of chromium with a ceramic powder dispersed therein into a space formed between said outer and inner tubes of said tubular capsule;
subjecting said tubular capsule to hot working so as to integrate said powder with said inner tube; and
removing said outer tube.

9. The method of producing a dispersion strengthened ferritic steel cladding tube according to claim 8, wherein said powder of the ferritic steel has a composition comprising 0.04 to 0.2% by weight of carbon, 0.3% by weight or less of silicon, 1.5% by weight or less of manganese, 8 to 13% by weight of chromium, and 0.03% by weight or less of aluminum, with the balance being iron and unavoidable impurities.

10. The method of producing a dispersion strengthened ferritic steel cladding tube according to claim 8, wherein said ceramic powder comprises one or more selected from the group consisting of $Y_2O_3$, $ZrO_2$, $Al_2O_3$ and MgO.

11. The method of producing a dispersion strengthened ferritic steel cladding tube according to claim 8, wherein said ceramic powder is dispersed in said powder of the ferritic steel in an amount of 0.05 to 1.5% by weight.

12. The method of producing a dispersion strengthened ferritic steel cladding tube according to claim 8, wherein said inner tube has a composition comprising 18 to 30% by weight of chromium and 0.2% by weight or less of carbon, with the balance being iron and unavoidable impurities.

13. The method of producing a dispersion strengthened ferritic steel cladding tube according to claim 8, wherein said method further comprises deaerating said tubular capsule, prior to said hot working.

14. The method of producing a dispersion strengthened ferritic steel cladding tube according to claim 8, wherein said hot working comprises hot extrusion.

* * * * *